United States Patent
McCurdy

(10) Patent No.: US 6,556,915 B2
(45) Date of Patent: Apr. 29, 2003

(54) SYSTEM AND METHOD FOR CONTROLLING VEHICLE CRUISE SPEED

(75) Inventor: Roger A. McCurdy, Troy, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/883,611

(22) Filed: Jun. 18, 2001

(65) Prior Publication Data

US 2002/0193932 A1 Dec. 19, 2002

(51) Int. Cl.⁷ .............................. B60T 7/12; G06F 7/00
(52) U.S. Cl. .............................. 701/97; 701/91; 701/93; 340/442; 340/532; 152/154.2; 123/339.15
(58) Field of Search .......................... 701/93, 96, 97; 340/439, 442, 444, 445, 449, 500, 501, 532; 152/151, 152, 154.1, 154.2, 415; 200/61.22; 702/47, 138, 130; 123/319, 339.1, 339.13, 339.14, 339.15, 339.16, 361; 180/170, 179

(56) References Cited

U.S. PATENT DOCUMENTS

| | | | | |
|---|---|---|---|---|
| 4,729,104 A | * | 3/1988 | Hara ........................... | 123/352 |
| 4,829,438 A | * | 5/1989 | Etoh ........................... | 123/352 |
| 4,951,208 A | | 8/1990 | Etoh ........................... | 701/93 |
| 5,107,948 A | | 4/1992 | Yamamoto ................... | 180/197 |
| 5,189,619 A | | 2/1993 | Adachi et al. ................ | 701/93 |
| 5,327,346 A | * | 7/1994 | Goodell ....................... | 152/416 |
| 5,477,457 A | * | 12/1995 | Okada ......................... | 180/170 |
| 5,546,308 A | * | 8/1996 | Yamamoto ................... | 180/197 |
| 5,899,830 A | * | 5/1999 | Tabata ......................... | 123/399 |
| 6,052,644 A | | 4/2000 | Murakami et al. ............ | 701/93 |
| 6,292,096 B1 | * | 9/2001 | Munch et al. ............ | 116/34 R |

* cited by examiner

Primary Examiner—Jacques H. Louis-Jacques
(74) Attorney, Agent, or Firm—Tarolli, Sundheim, Covell & Tummino L.L.P.

(57) ABSTRACT

A system (10) includes a vehicle-based controller (30) for automatically controlling a throttle (32) of a vehicle (14) to maintain a desired cruise speed of the vehicle. The system also includes a tire-based unit (20) for monitoring an operating condition of a vehicle tire (12) of the vehicle (14). The tire-based unit (20) provides a signal (22) indicative of a sensed operating condition of the vehicle tire (12) to the controller (30). The controller (30) determines an abnormal condition of the vehicle tire (12) when the sensed operating condition reaches a predetermined level. The controller (30) limits the vehicle cruise speed to a predetermined maximum cruise speed when the vehicle tire (12) is in the abnormal condition.

12 Claims, 2 Drawing Sheets

SYSTEM AND METHOD FOR CONTROLLING VEHICLE CRUISE SPEED

TECHNICAL FIELD

The present invention relates to a system for controlling a vehicle cruise speed to maintain a desired cruise speed of the vehicle. More particularly, the present invention relates to a system and method for controlling a vehicle cruise speed wherein the system limits the desired cruise speed when an abnormal condition of a vehicle tire is sensed.

BACKGROUND OF THE INVENTION

It is known to provide a vehicle with a cruise control system for controlling a vehicle cruise speed to maintain a desired cruise speed of the vehicle. The known cruise control systems are operatively connected to the vehicle throttle and operate the throttle automatically in order to maintain the desired cruise speed of the vehicle.

It is also known to sense an operating condition of a vehicle tire in order to monitor the operating condition while operating the vehicle. Such operating conditions include the inflation pressure and temperature of the vehicle tire. The operating parameters may be sensed by sensors that are mounted to individual vehicle tires and/or rims of the vehicle and provide a signal that includes data relating to the inflation pressure of the individual vehicle tire.

SUMMARY OF THE INVENTION

In accordance with the present invention, a system includes vehicle-based means for automatically controlling a throttle of a vehicle to maintain a desired cruise speed of the vehicle. The system also includes a tire-based unit for monitoring an operating condition of a vehicle tire of the vehicle. The tire-based unit provides a signal indicative of a sensed operating condition of the vehicle tire to the controller. The controller determines an abnormal condition of the vehicle tire when the sensed operating condition reaches a predetermined level. The controller limits the vehicle cruise speed to a predetermined maximum cruise speed when the vehicle tire is in the abnormal condition.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF AN EXAMPLE EMBODIMENT

Figure 1:
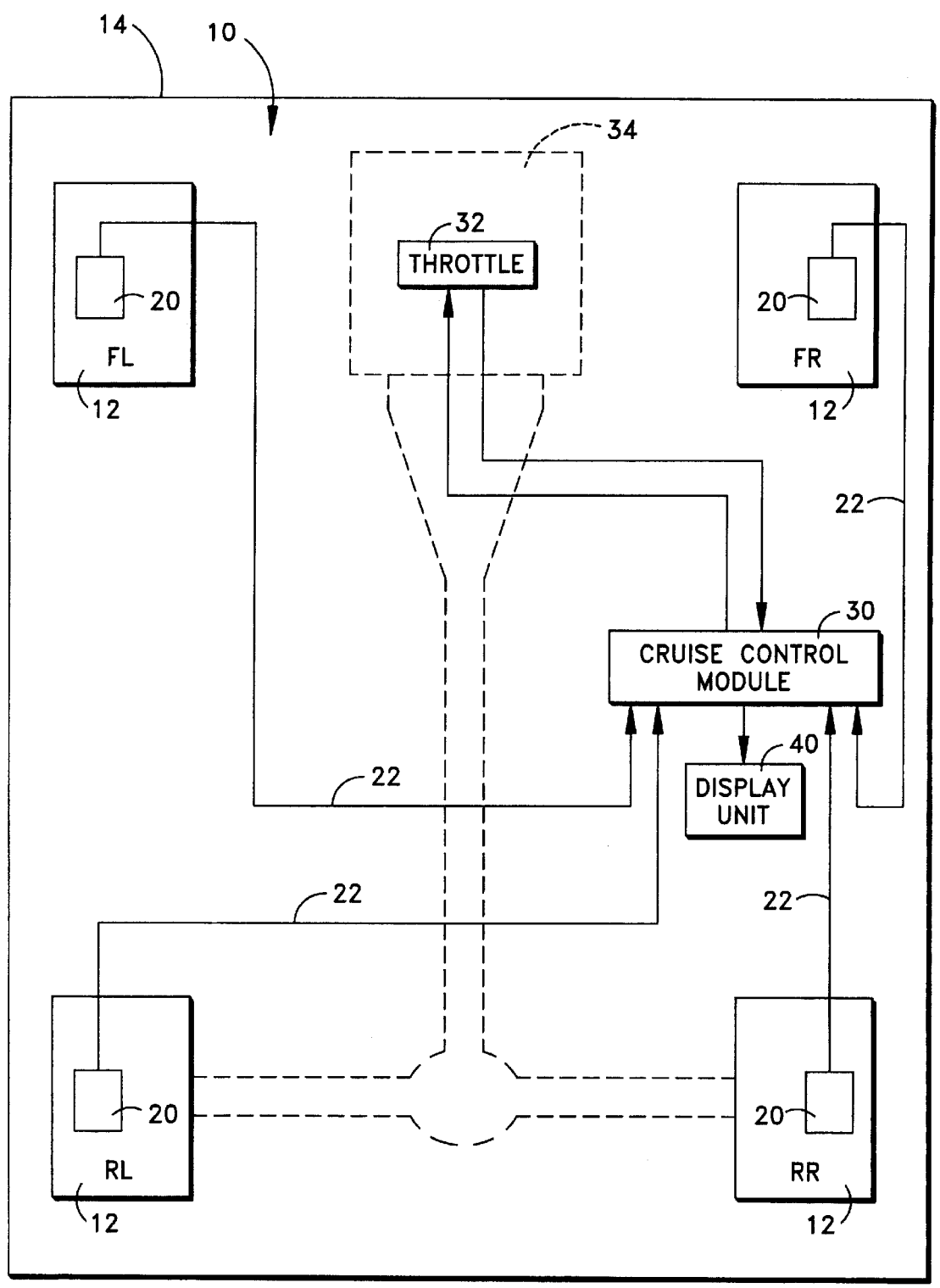
FIG. 1 is a schematic illustration of a system for controlling a vehicle cruise speed in accordance with an example embodiment of the present invention.

In accordance with an example embodiment of the present invention, FIG. 1 illustrates a system 10 for controlling a vehicle cruise speed of a vehicle 14. In the embodiment illustrated in FIG. 1, the vehicle 14 includes four vehicle tires 12. The vehicle tires 12 are located at vehicle tire positions designated front-left (FL), front-right (FR), rear-left (RL) and rear-right (RR). Those skilled in the art, however, will recognize that the vehicle 14 could include more than four vehicle tires 12 or fewer than four vehicle tires.

The system 10 includes tire-based units 20 for sensing an operating condition of the vehicle tires 12. A tire-based unit 20 is associated with each of the vehicle tires 12. Each tire-based unit 20 includes means, such as a sensor or transducer, for sensing the operating condition of the vehicle tire. Each tire-based unit 20 is operative to provide a signal indicative of the sensed operating condition of the vehicle tire 12. The signals are illustrated generally at 22 in FIG. 1. The signals 22 may also be indicative of the vehicle tire position at which the operating conditions are sensed.

The tire-based units 20 may be configured to sense a variety of operating conditions of the vehicle tire 12. For example, a tire-based unit 20 may include a pressure sensor for sensing inflation pressure of the vehicle tire 12. In this instance, the signal 22 would be indicative of the sensed inflation pressure of the vehicle tires 12. Alternatively, a tire-based unit 20 may include a temperature sensor for sensing a temperature of the vehicle tire 12. In this instance, the signal 22 would be indicative of the sensed temperature of the vehicle tires 12. Still further, the tire-based unit 20 may include one or more various other sensors for sensing a variety of conditions at the tire, such as tire balance, tread wear, tread separation, and tire loading (e.g., overloading). Signal(s) provided by such sensor(s) would accordingly be indicative of the respective sensed condition at the vehicle tires 12.

The system 10 also includes vehicle-based means for automatically controlling a cruise speed of the vehicle 14, such as a cruise control module 30. The cruise control module 30 is operatively connected to a throttle 32 of an engine 34 of the vehicle. When the cruise control module 30 is activated, the cruise control module actuates the throttle 32 to maintain a desired cruise speed of the vehicle 14, as selected by an operator (not shown) of the vehicle. The cruise control module 30 automatically actuates the throttle 32 to cause acceleration or deceleration of the vehicle 14 in order to maintain the desired cruise speed.

The tire-based units 20 are operatively connected to the cruise control module 30 to provide the signals 22, and thus the sensed operating conditions, to the cruise control module. The tire-based units 20 may be hard-wired to the cruise control module 30, such as by wire or cable, to provide the signals 22 to the cruise control module. Alternatively, the signals 22 may be transmitted via radio waves to the cruise control module 30, such as by a transmitter (not shown) included in the tire-based units 20.

In the example embodiment illustrated in FIG. 1, the tire-based units 20 provide the signals 22 directly to the cruise control module 30. It will be appreciated, however, that there are a variety of configurations by which the signals 22 could be provided to the cruise control module 30. For example, the system 10 could include separate electronics (not shown), such as a controller or a receiver, for receiving the signals 22. Such electronics could be operatively connected to the cruise control module 30 to provide the signals 22, specifically the sensed operating conditions, to the cruise control module.

The tire-based units 20 may provide the signals 22 to the cruise control module 30 continuously or at predetermined intervals. The cruise control module 30 monitors the sensed operating conditions provided in the signals 22 to determine if the operating condition reaches a predetermined level. When a sensed operating condition of any vehicle tire 12 reaches the predetermined level, the cruise control module 30 determines an abnormal condition of the vehicle tire. Alternatively, the tire-based units may provide the signals 22 only when the sensed operating condition of their respective vehicle tires 12 reaches a predetermined level. In this instance, the cruise control module 30 would determine an abnormal condition of the vehicle tires 12 upon receiving the signals 22.

It will be appreciated that it may be undesirable or hazardous to operate the vehicle 14 at or above a certain cruise speed when any of the vehicle tires 12 are in the abnormal condition. According to the present invention, the cruise control module 30 limits the desired cruise speed of the vehicle 14 to a predetermined maximum cruise speed when any of the vehicle tires 12 are in the abnormal condition. For example, suppose the cruise control module 30 is maintaining the cruise speed of the vehicle 14 at a desired cruise speed that is higher than the predetermined maximum cruise speed. If the cruise control module 30 determines the abnormal condition at any of the tire positions, the cruise control module automatically limits the desired cruise speed to the predetermined maximum cruise speed. Thus, in this example, the cruise control module 30 would automatically slow the cruise speed of the vehicle 14 to the predetermined maximum.

Also, according to the present invention, when any of the vehicle tires 12 are in the abnormal condition, the cruise control module 30 limits the desired cruise speed set by the vehicle operator to the predetermined maximum cruise speed. For example, if the vehicle operator attempts to set a desired cruise speed that is above the predetermined maximum cruise speed, the cruise control module 30 will automatically prevent the operator requested desired speed and limit the desired speed to at or below the predetermined maximum cruise speed.

It will be appreciated that the system 10 is thus operable to limit the cruise speed of the vehicle 14 to a predetermined maximum cruise speed when the cruise speed of the vehicle 14 is being controlled automatically by the cruise control module 30. It will further be appreciated that the predetermined maximum cruise speed can be overridden by the vehicle operator simply by deactivating the cruise control module 30 and operating the vehicle throttle 32 manually, via traditional control pedals (not shown).

With regard to the manual override by the vehicle operator subsequent to the limitation of speed based upon the sensed abnormal tire condition, a default maximum speed despite override is yet another aspect of the present invention. In other words, a speed limitation would be imposed even after the unlikely event of a manual (operator-caused) override. In one embodiment, the override function is accomplished within the cruise control module 30 via suitable input from the vehicle operator. The maximum speed limitation after override may be different than the initial maximum speed limitation (i.e., the limitation associated with the sensed abnormal tire condition).

It is contemplated that the initial speed limitation of speed is clearly a safety-warning indicator. The aspect of limiting speed even after the override would provide for redundant aiding in the maintenance of safety despite a vehicle operator's disregard for the safety warning inherently provided by the initial limitation.

It will also be appreciated that the present invention may be particularly advantageous in a vehicle 14 equipped with vehicle tires 12 of a type commonly referred to as "run-flat" tires. Such run-flat tires are designed to be operable upon a partial or complete loss of inflation pressure, such as when a vehicle tire 12 becomes punctured. When a loss of inflation pressure occurs, the run-flat tires are designed to be operable at a predetermined maximum speed for a predetermined maximum distance. According to the present invention, when the system 10 is used in a vehicle 14 equipped with run-flat vehicle tires 12, the system is operable to limit the desired speed maintained by the cruise control module 30 to the predetermined maximum speed as determined by the construction of the run-flat tires. The system 10 may also be operable to monitor and indicate the distance traveled on the vehicle tires 12 when any of the tires is in the abnormal condition.

The cruise control module 30 may be operatively connected to a display unit 40. The display unit 40 may provide indication of the desired cruise speed as well as an indication of the abnormal condition of any of the vehicle tires 12. The display unit 40 may also indicate that the desired cruise speed is limited to the predetermined maximum cruise speed. Such indications may be in the form visual devices (e.g., display screens or indicator lights) and/or audible devices (e.g., buzzers or chimes). For example, the display unit 40 may display that the front-left tire is in an abnormal condition by sounding a buzzer, flashing an indicator light representative of the front-left tire position, and displaying a warning indicator signaling the abnormal condition.

Figure 2:
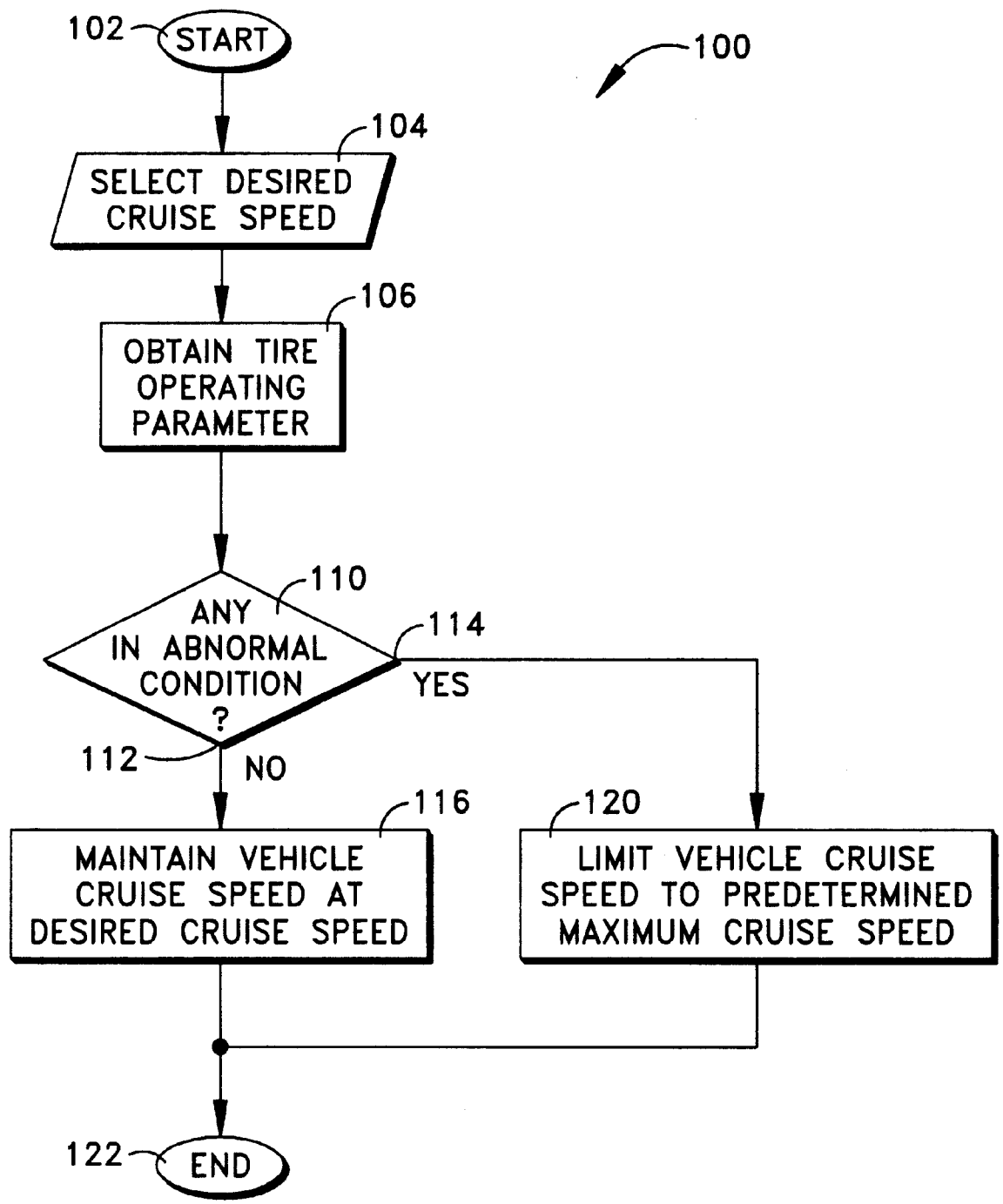
FIG. 2 is a flow chart representative of a process by which to control a vehicle cruise speed in accordance with an example embodiment of the present invention.

It will be appreciated that the system 10 performs a process wherein the cruise speed of the vehicle 14, controlled by the cruise control module 30, is limited to a predetermined maximum cruise speed when any of the vehicle tires 12 is in an abnormal condition. The method by which this process 100 is performed is illustrated in FIG. 2.

At step 102, the process 100 begins. At step 104, a desired cruise speed is selected by the vehicle operator. This is typically done by activating the cruise control module 30 when the vehicle is travelling at the desired cruise speed. At step 106, the cruise control module 30 obtains the tire operating conditions and determines, at step 110, whether any of the vehicle tires 12 is in an abnormal condition. If none of the vehicle tires 12 are in the abnormal condition, indicated at 112, the process 100 proceeds to step 116, in which the cruise control module 30 maintains the vehicle cruise speed at the desired cruise speed. If any of the vehicle tires 12 are in the abnormal condition, indicated at 114, the process 100 proceeds to step 120, in which the cruise control module 30 limits the vehicle cruise speed to the predetermined maximum cruise speed. The process 100 terminates at step 122 when the cruise control module 30 is deactivated.

From the above description of the invention, those skilled in the art will perceive improvements, changes and modifications. Such improvements, changes and modifications within the skill of the art are intended to be covered by the appended claims.

Having described the invention, the following is claimed:

1. A system for controlling cruise speed of a vehicle, said system comprising:
   vehicle-based means for automatically controlling a throttle of the vehicle to maintain a desired cruise speed of the vehicle; and
   tire-based means for monitoring an operating condition of a tire of the vehicle, said means for monitoring providing a signal indicative of a sensed operating condition of the tire to said means for automatically controlling, said means for automatically controlling determining an abnormal condition of the tire when the sensed operating condition reaches a predetermined level, said means for automatically controlling limiting the vehicle cruise speed to a predetermined maximum cruise speed when the tire is in said abnormal condition.

2. The system as defined in claim 1, wherein said means for automatically controlling adjusts the desired cruise speed to the predetermined maximum cruise speed when the desired cruise speed is above the predetermined maximum cruise speed when the tire is in said abnormal condition.

3. The system as defined in claim 1, wherein the desired cruise speed is manually selectable by an operator of the vehicle, said means for automatically controlling preventing manual selection of a desired cruise speed above the predetermined maximum cruise speed while the tire is in said abnormal condition.

4. The system as defined in claim 1, wherein the operating condition of the tire is an inflation pressure of the tire, said means for monitoring comprising a pressure sensor for sensing a sensed inflation pressure of the tire.

5. The system as defined in claim 4, wherein said means for automatically controlling determines said abnormal condition when the sensed inflation pressure is below a predetermined level.

6. The system as defined in claim 1, wherein said operating condition of the tire is a temperature of the tire, said means for monitoring comprising a temperature sensor for sensing a sensed temperature of the tire, said means for automatically controlling determining the abnormal condition when the sensed temperature is above a predetermined level.

7. The system as defined in claim 1, wherein the tire comprises a run-flat vehicle tire constructed to permit the vehicle to travel at said predetermined maximum cruise speed upon a loss of inflation pressure, said means for monitoring sensing the loss of inflation pressure and providing a signal indicative of the loss of inflation pressure to said means for automatically controlling, said means for controlling determining the abnormal condition upon receiving said signal indicative of the loss of inflation pressure.

8. The system as defined in claim 1, wherein said means for automatically controlling comprises a vehicle cruise control system operatively connected to a throttle of the vehicle, said cruise control system adjusting said throttle to maintain the desired cruise speed.

9. The system as defined in claim 1, including means for manually overriding said means for automatically controlling limiting vehicle cruise speed.

10. A system for controlling the cruise speed of a vehicle equipped with run-flat vehicle tires, said system comprising:

means for automatically controlling a throttle of a vehicle to maintain a desired cruise speed of the vehicle; and means for sensing a loss if inflation pressure in any of the run-flat vehicle tires, said means for sensing being operatively connected to said means for automatically controlling to provide a signal indicative of a loss of inflation pressure in any of the run-flat vehicle tires to said means for automatically controlling, said means for automatically controlling limiting the vehicle cruise speed to a predetermined maximum cruise speed upon a loss of inflation pressure in any of the run-flat vehicle tires.

11. A method for controlling cruise speed of a vehicle, said method comprising the steps of:

maintaining the cruise speed of the vehicle at a desired cruise speed using a cruise control system;

monitoring an operating condition of a tire of the vehicle;

detecting an abnormal condition of the tire when the monitored operating condition reaches a predetermined level; and limiting the cruise speed to a predetermined maximum cruise speed when the abnormal condition is detected.

12. A system for controlling cruise speed of a vehicle, the system comprising:

a cruise control device that automatically controls an engine throttle of the vehicle to maintain a desired cruise speed of the vehicle; and a tire condition monitoring device associated with a tire of the vehicle and operable for sensing an operating condition of the tire, the tire condition monitoring device providing a tire condition signal indicative of a sensed tire condition, the cruise control device receiving the tire condition signal from the tire condition monitoring device and controlling the cruise speed in response to the tire condition.

* * * * *